May 24, 1927. Re. 16,633

E. A. TITUS

COAL CHUTE GATE

2 Sheets-Sheet 1

Original Filed March 12, 1925

INVENTOR.
Edwin A. Titus.
BY
Walter N. Haskell.
his ATTORNEY.

May 24, 1927. Re. 16,633

E. A. TITUS

COAL CHUTE GATE

Original Filed March 12, 1925 2 Sheets-Sheet 2

INVENTOR.
Edwin A. Titus,
BY Walter N. Haskell,
his ATTORNEY.

Reissued May 24, 1927. Re. 16,633

UNITED STATES PATENT OFFICE.

EDWIN A. TITUS, OF MOLINE, ILLINOIS.

COAL-CHUTE GATE.

Original No. 1,583,031, dated May 4, 1926, Serial No. 14,910, filed March 12, 1925. Application for reissue filed March 5, 1927. Serial No. 173,208.

My invention has reference to coal chute gates, and is designed for use in connection with coaling stations, large coal bins, and other structures fitted for the storage and discharge of large quantities of coal. It is not confined to such use, however, but can be employed in connection with the storage bins for gravel, sand, and other material.

In the discharge of coal from storage bins, by permitting the same to empty through a chute by force of gravity there is a tendency of the finer material to find its way toward the bottom of the stream, while the coarser portion thereof remains at the top. In some structures of the kind mentioned a barrier to the movement of the coal is provided by means of a gate extending upwardly through the bottom of the chute, and which is withdrawn downwardly when it is desired to permit a movement of the fuel. The tendency in this arrangement is for the gate to hold back the finer material and dust in the lower part of the stream, while the upper strata, formed of the coarser material, runs out. In another form a gate is lowered into the chute from above, and upon the same being raised to permit a movement of the coal the lower strata is permitted to move freely, letting out a quantity of the finer and less desirable material. Possibly in the next succeeding operation there will be discharged a pocket of the heavier coal. As a result the run of the coal is not uniform, which is objectionable, especially in the operation of locomotives, wherein one engineer may secure a quantity of coal of a desired quality, while the one succeeding him may get a supply of the finer stuff, with a consequent falling off in the efficiency of the engine. In some cases the coal stored in the bins would be of a uniform character throughout, so that the above conditions would not apply.

One of the purposes of the present invention is to provide a barrier for the coal, which, upon being opened, will permit a discharge of fuel of uniform run and quality, so that there will be no perceptible variations in the successive discharges. This is accomplished by means of a pair of gates operating transversely of the chute, and capable of opening so as to form no obstruction to the movement of the coal. In connection therewith is provided a simple and efficient means for opening and closing the gates.

The above-named and other features and advantages of the invention will more fully appear from the following specification, reference being had to the accompanying drawings, in which,—

Figure 1:
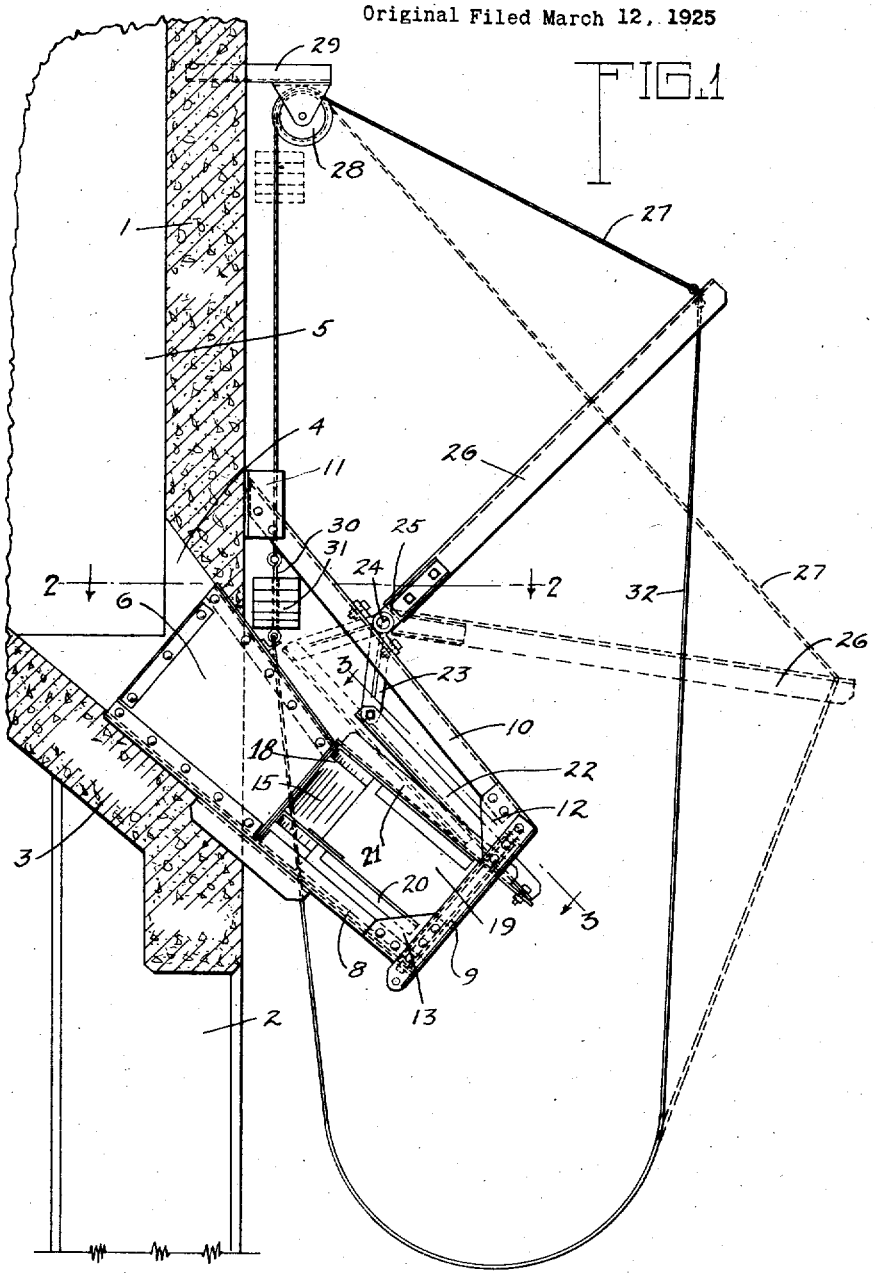
Figure 1 is a fragmentary section of a structure equipped with the invention.
Figure 2:
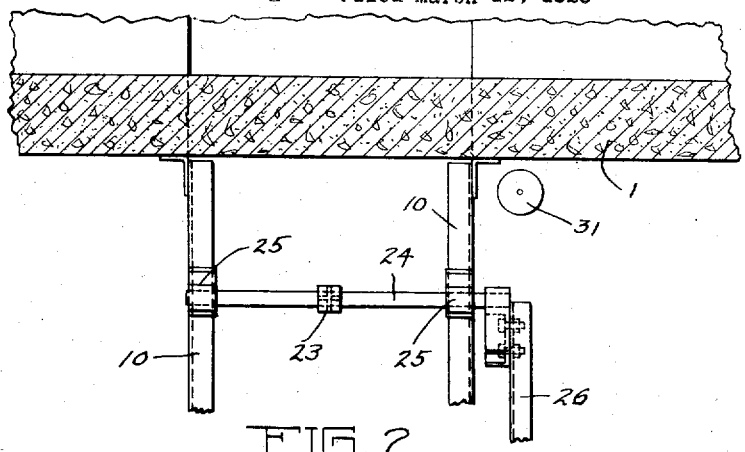
Figure 2 is a detail of the shaft 24 and supports therefor, partly in section on the broken line 2—2 of Figure 1.

The reference number 1 indicates the outer wall of a coal storage building, 2 one of the supporting columns thereof, and 3 the inclined floor of a discharge opening 4, the upper end of which opens into one of the storage bins 5 with which the building is provided. Supported in the opening 4 is a chute 6, having an outward extension formed of a bottom plate 7, angle-plates 8 at the sides thereof, and uprights 9, also of angle-plate formation. The upper ends of the uprights 9 are braced by pieces 10, the upper ends of which are attached to fixtures 11, secured to the face of the wall 1. Corner-plates 12 strengthen the connection of the upper ends of said uprights with the pieces 10, and similar plates 13 assist in the union of the lower ends of said uprights and the plates 8.

Figure 3:
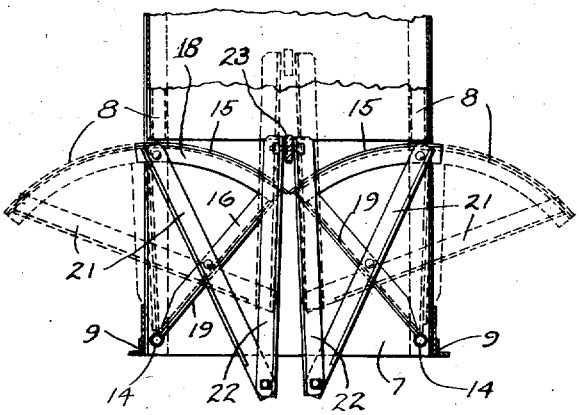
Figure 3 is a plan view of the discharge end of the chute, partly in section on the broken line 3—3 of Figure 1.

On the inside of the uprights 9 are posts 14, with which a pair of arcuate plates 15 has a pivotal connection, by means of arms 16 extending from the upper corners of said plates to said pivots. At their inner ends said arms are attached to angle-plates 18, secured to the rear faces of the plates 15. Said plates are slidable on the floor of the chute, and comprise a pair of gates forming a barrier when closed, as shown in complete lines in Figure 3, to the downward movement of the coal.

Fixed to the inner sides of the arms 16 are plates 19, further braced near their lower edges by angle-plates 20. A slight space is left between the lower edges of said plates and the floor of the chute, so as to prevent friction between said parts. Fixed to the outer corners of the gates 15 are arms 21, which intersect the arms 16, and are also rigidly attached thereto. Each of the arms 21 and gate structures to which they are attached form unitary parts of the invention, operating together. The arms 21 project outwardly beyond the end of the chute, and connected with the ends thereof are bars 22, which extend rearwardly to a pivotal connection with the end of an arm 23, fixed to a shaft 24, rockingly mounted in bearings 25 on the supports 10. Secured to one end of the shaft 24 is a lever 26, by means of which the shaft can be operated, the downward movement thereof serving to rock the arm 23 rearwardly, as shown in broken lines, such movement drawing the bars 22 in the same direction, and operating the arms 21 to swing the gates 15 outwardly, leaving the way open for the downward passage of the contents of the bin. The gates and supporting parts pass outwardly through openings in the side of the chute, and when such gates are fully open the plates 19 fill such openings, and form the side walls of the chute.

Fixed to the end of the lever 26 is a rope 27, which passes upwardly over a pulley 28, supported from an arm 29 fixed in the wall 1, and thence downwardly to a connection with a rod 30 which supports a number of weights 31, forming a counter-weight for the gates 15 and operating mechanism thereof, to assist in returning them to their original positions, after the desired amount of coal has been released. Another rope 32 is attached to the lever 26, and looped downwardly, the other end thereof being connected with the lower end of the rod 30. By means of the outer part of said rope the lever 26 can be pulled downwardly to open the gates 15, and the inner end thereof can be employed for pulling downwardly on the weights 31 and inner end of the rope 27 to assist in raising the lever and closing the gates under unusual conditions, as when the parts are coated with snow or ice.

It will be noted that the movement of the bars 22 is in a longitudinal direction, and the arrangement of such bars and the arms or levers to which they are attached is such as to produce in effect a modified toggle-joint mechanism. The arrangement of said parts, together with the relative lengths of the arm 23 and lever 26, results in the application of power to the gates, to open or close the same, in a greatly multiplied degree, so that the device can be actuated with the expenditure of a comparatively small amount of force on the lever 26.

It will be realized from the foregoing description that I provide a gate, particularly adapted for use in the discharge chute of a storage bin, in which two opposed gate members are employed which penetrate the chute passage from the sides, as contrasted to the generally vertically actuated gates of the prior art. This disposition of gates is of particular advantage, in railroad coaling, in insuring the delivery of a uniform grade or mixture of coal for locomotives. Although I do not wish to be limited to the specific structure herein shown, I find it advantageous to pivot arcuate gates at opposite sides of the chute. In the form herein shown the convex sides of the arcuate gates face the oncoming stream of coal, the pivots being to the rear of the gates, as clearly shown in Figure 3.

I do not wish to be limited to the specific description and disclosure herein found, but wish my description and drawings to be taken as in a broad sense illustrative and diagrammatic rather than as limiting me to the particular mechanical expedients herein disclosed. In particular, it will be realized that the side passage members or plates which form the side walls of the chute when the gates are open are elective and under some circumstances can be dispensed with. In particular it will be understood that I do not wish to be limited to any specific design of gate or gate supporting frame or any specific means for actuating the gates. My invention consists broadly in the innovation of employing a side cut gate, or, in the form herein shown, a pair of opposed side cut gates, which normally prevent the flow of coal along the chute, but which may easily be withdrawn, laterally, to permit a flow of coal when desired. Where in the claims I describe the chute as horizontal I wish it to be understood as differentiating the chute employed from a vertical chute through which material drops without being supported upon a chute bottom. By horizontal chute I mean a chute having a material supporting bottom, which bottom may be literally horizontal or may be inclined as shown in the accompanying drawings. Whereas I have described my invention in connection with a coaling plant it will be realized that I may employ it for other purposes and for other materials.

I claim:

1. In combination with the discharge chute of a coal storage bin, a pair of frames pivoted at the sides of the chute and projected rearwardly therein, gates fixed to said frames so as to normally close the passage-way in said chute, and capable of transverse movement to or from each other, plates carried by said frames, at approximately a right angle with said gates, and forming the side walls of the chute when the gates are fully open, and means for actuating said gates to open or close the same.

2. In combination with the discharge chute of a coal storage bin, a pair of pivots at the sides of the chute, at right angles with the floor thereof, arcuate gates connected at their inner corners with said pivots, so as to be capable of movement transversely of the chute, levers fixed to the outer corners of said gates and secured to the connecting means of said gates intermediate said gates and their pivots, a rock-shaft supported above said gates, a pair of draw-bars connected with the ends of said levers and operatively connected with said rock-shaft, to impart the movement of said shaft to said gates, to open or close the same, as desired, and a lever attached to said rock-shaft, for the operation thereof.

3. In combination with the discharge chute of a storage bin, a pair of gates pivotally mounted in said chute, so as to be movable transversely thereof, lever devices connected with said gates, so as to permit the application of power thereto at approximately a center line of the chute, a rock-shaft supported above said gates and provided with a power-transmitting arm, bars connecting said arm with said lever devices, so that said bars will have longitudinal movement, a lever connected with said rock-shaft, so as to project at right angles with the chute, upwardly and outwardly, a counterweight connected with the outer end of said lever, to assist in returning said gates to a closed position after having been opened, and a rope connected with the outer end of said lever, extending downwardly and rearwardly to a connection with said counterweight, to assist in the operation thereof.

4. In combination with the discharge chute of a storage bin, a pair of pivots at the sides of said chute, frames formed of cross-pieces rigidly attached to each other, the end of one of each cross-piece being connected with said pivots, a pair of arcuate plates attached to the ends of said cross-frames, the pivoted cross-pieces being connected with the inner corners of said plates, and the other cross-pieces being attached to the outer corners of said plates, and converging towards each other to points near the center line of the chute, an actuating arm mounted above said plates, and draw-bars connecting the ends of said last-named cross-pieces with said actuating arm, to impart the movement thereof to said plates with an increase of power.

5. In combination with a horizontal discharge chute, a pair of gates pivoted at opposite sides of said chute for rotation about axes generally perpendicular to the bottom of the chute and capable of transverse movement to or from each other, and means for actuating said gates.

6. In combination with a horizontal discharge chute, a pair of gates pivoted at opposite sides of said chute for rotation about axes generally perpendicular to the bottom of the chute and capable of transverse movement to or from each other, and means for actuating said gates, the pivots of said gates being positioned to the rear of said gates in relation to the downwardly moving material.

7. In combination with a horizontal discharge chute, a pair of gates pivoted at opposite sides of said chute for rotation about axes generally perpendicular to the bottom of the chute and capable of transverse movement to or from each other, and means for actuating said gates, and plates, associated with said gates and adapted to form side walls of the chute when the gates are opened.

8. In combination with a horizontal discharge chute, a transversely movable gate pivoted at one side of the chute for rotation about an axis generally perpendicular to the chute bottom, and means for moving it transversely into and out of said chute along a generally horizontal path.

9. In combination with a horizontal discharge chute, a gate member normally positioned in the line of movement of the material passing along said chute and means for moving it out of and into alignment with the chute along a generally horizontal path, said gate being generally perpendicular to the bottom of the chute.

10. In combination with the discharge chute of a storage bin, a pair of arcuate gates having a pivotal connection at the sides of said chute so as to be movable transversely of the chute, said pivots being generally perpendicular to the material supporting chute bottom, and means for operating said gates to open or close the same, as desired.

11. In combination with the discharge chute of a storage bin, a pair of opposed gates mounted adjacent said chute and adapted normally to close the passageway in said chute and capable of transverse movement to or from each other, plates, associated with said gates and adapted to form side walls of the chute when the gates are open, and means for actuating said gates.

Signed at Moline, county of Rock Island, and State of Illinois, this 10th day of February, 1927.

EDWIN A. TITUS.